March 8, 1966 MASAO IDA 3,239,019
APPARATUS FOR EFFECTING CHANGE OF DIRECTION AND
LATERAL MOVEMENT OF AUTOMOBILE
Filed Jan. 3, 1963 9 Sheets-Sheet 1

INVENTOR.
MASAO IDA
BY
Kurt Kelman
AGENT

March 8, 1966  MASAO IDA  3,239,019
APPARATUS FOR EFFECTING CHANGE OF DIRECTION AND
LATERAL MOVEMENT OF AUTOMOBILE
Filed Jan. 3, 1963  9 Sheets-Sheet 4

INVENTOR.
MASAO IDA
BY
Kurt Kelman
AGENT

INVENTOR.
MASAO IDA
BY
Kurt Kelman
AGENT

March 8, 1966  MASAO IDA  3,239,019
APPARATUS FOR EFFECTING CHANGE OF DIRECTION AND
LATERAL MOVEMENT OF AUTOMOBILE
Filed Jan. 3, 1963  9 Sheets-Sheet 6

INVENTOR.
MASAO IDA
BY
Kurt Kelman
AGENT

March 8, 1966  MASAO IDA  3,239,019
APPARATUS FOR EFFECTING CHANGE OF DIRECTION AND
LATERAL MOVEMENT OF AUTOMOBILE
Filed Jan. 3, 1963  9 Sheets-Sheet 9

INVENTOR.
MASAO IDA
BY
Kurt Kelman
AGENT

3,239,019
APPARATUS FOR EFFECTING CHANGE OF DIRECTION AND LATERAL MOVEMENT OF AUTOMOBILE
Masao Ida, 7-79 Yawata-cho, Ichikawa-shi, Chiba Prefecture, Japan
Filed Jan. 3, 1963, Ser. No. 249,235
Claims priority, application Japan, Mar. 26, 1962 (utility model), 37/14,020
7 Claims. (Cl. 180—1)

This invention relates to an apparatus for lifting, turning, and laterally moving an automobile. More particularly, this invention relates to such apparatus which is fixedly attached under the floor of an automobile.

Because of the increase in the number of automobiles, it has become more and more difficult to park them. It is also difficult to lift an automobile by means of a jack on soft ground for replacing a punctured tire or when the wheels are buried in sandy soil.

An object of this invention is to provide an apparatus for turning an automobile within the area not larger than the length of the automobile.

Another object of this invention is to provide an apparatus for moving an automobile in a lateral direction.

Another object of this invention is to provide an apparatus for easily lifting an automobile.

Another object of this invention is to provide such apparatus which can be operated from the driver's seat.

Another object of this invention is to provide such an apparatus which is actuated by fluid pressure transmitted from a compressor coupled with the engine by means of a partially flexible pipe.

Another object of this invention is to provide an apparatus which is actuated by a transmission connected to the crank shaft of the engine through a clutch.

Another object of this invention is to provide an apparatus for turning an automobile on a built-in turn table while wheels for lateral movement are in a raised position, and for moving the automobile laterally by pushing down said wheels, thereby lifting the turn table from the ground.

Other objects and characteristic features of this invention will become apparent from the following detailed description of preferred embodiments referring to the accompanying drawings, in which FIG. 1 is a perspective view of an apparatus according to this invention while lifting an automobile;

FIG. 5b is a top plan view of the device illustrated in FIG. 5a;

FIG. 6a is a partial view of another embodiment of this invention corresponding to FIG. 5a;

FIG. 7b is an enlarged front-elevational view showing a detail of the apparatus illustrated in FIG. 7a.

This invention relates to three connected mechanisms, viz. a lifting mechanism, a turning mechanism, and a mechanism for lateral movement, which will now be described in detail.

*Lifting mechanism*

Figure 3:
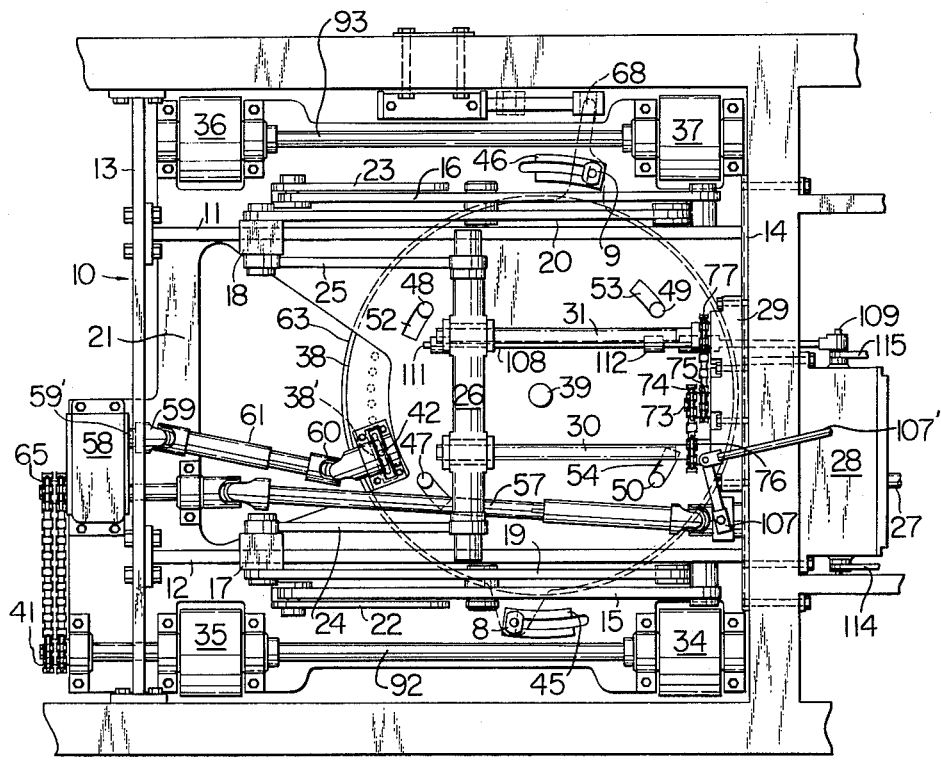
FIG. 3 is a top plan view of the apparatus in the inoperative state, the automobile being almost completely broken away.
Figure 4:
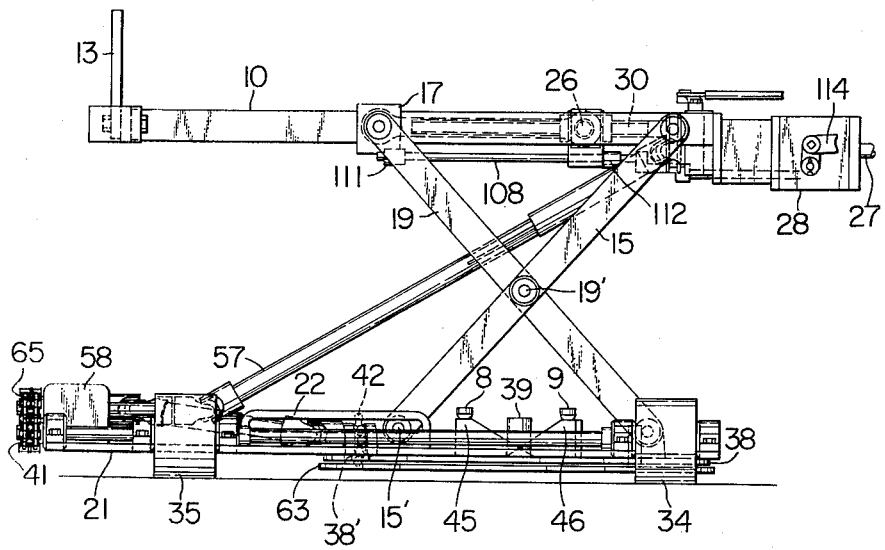
FIG. 4 is a side-elevational view of the apparatus in the position in which it lifts an automobile (not shown) for lateral movement.

Referring to FIGS. 1, 2, 3, and 4, the frame 10 of the apparatus conforms to the underside of an automobile. It has two longitudinal members 11 and 12 and two transverse members 13 and 14 which are connected to the longitudinal members by bolting or welding and are fastened to the automobile so as to avoid the propeller shaft. End portions of bars 15 and 16 are respectively pivoted to the front ends of the longitudinal members 11, 12. The longitudinal members 11 and 12 also carry sliding pivots 17 and 18, to which end portions of bars 19 and 20 are respectively attached. The centers of the bars 15 and 19 and those of the bars 16 and 20 are respectively connected by pivot pins 19'. Respective ends of the bars 19 and 20, as illustrated with respect to bar 19 in FIG. 4, are pivoted to the forward end of a base plate 21. The other ends of the bars 15 and 16 are respectively provided with guide pins 15' which slidably engage slotted guide plates 22 and 23 vertically projecting from the base plate 21. Rods 24 and 25 connect the sliding pivots 17 and 18 to a transverse member 26 which is mounted on the longitudinal members 11, 12.

On the front side of the transverse frame member 14, there is mounted a transmission 28 which selectively transmits driving force from the engine of the automobile through a shaft 27 to two threaded bars 30 and 31 and to a splined shaft 57 which actuates the mechanism for turning and lateral movement. The transmission 28 consists of gears and an electromagnetic or mechanical shifting mechanism operated from the driver's seat (not illustrated). As shown in FIG. 3, a bearing assembly 29 is provided on the rear side of the transverse frame movement 14 and supports a transmission output shaft 73 which passes through the transverse frame member 14. Two sprocket wheels 74 and 75 are fixed at the free end of the shaft 73. Respective ends of the two threaded bars 30 and 31 are journaled in the bearing assembly 29, and carry sprocket wheels 76 and 77. The sprocket wheels 74–77 are coupled by chains. Threaded bores of the slidable transverse member 26 engage the threaded bars 30 and 31. When the threaded bars 30 and 31 are rotated, the member 26 is shifted forwardly or rearwardly along the longitudinal members 11 and 12, thereby moving the sliding pivots 17 and 18, and varying the distance between the frame 10 and the base plate 21. The base plate 21 is normally closely attached to the frame 10, and is caused by clockwise rotation of the threaded bars 30 and 31, gradually to descend to the ground and subsequently to lift the automobile. The lowering of the automobile is effected by rotating the threaded bars counterclockwise.

*Turning mechanism and mechanism for lateral movement*

Figure 5A:
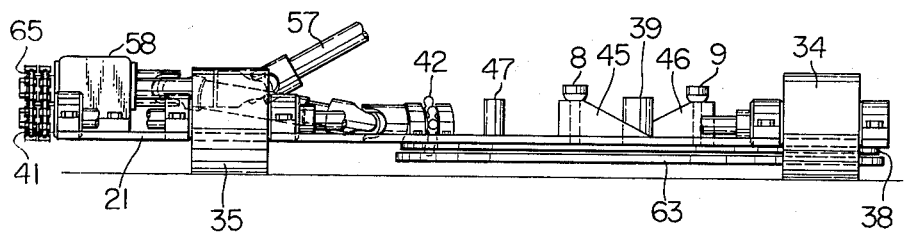
FIG. 5a is a fragmentary side-elevational view of the apparatus of FIG. 4.
Figure 5B:
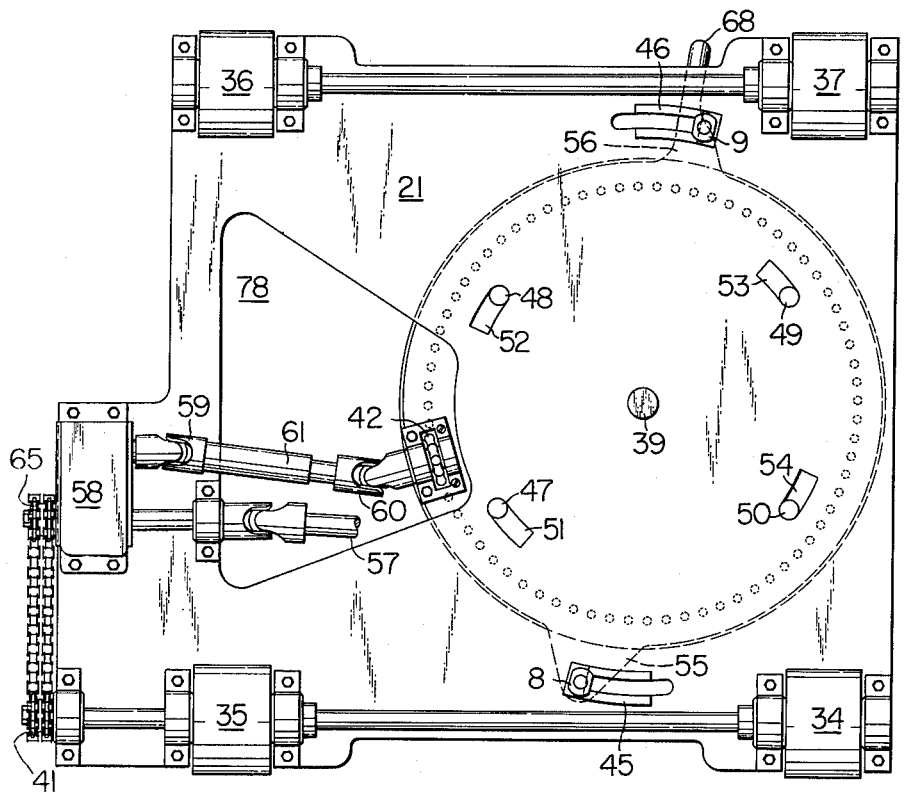
Figure 5C:
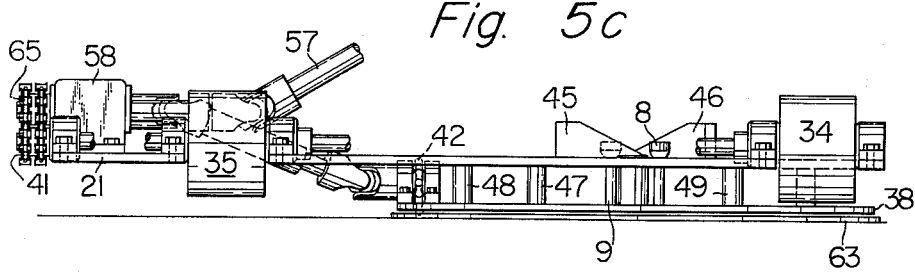
FIG. 5c is a side-elevational view of the device illustrated in FIG. 5a positioned for turning the automobile.

Wheels 34, 35, 36 and 37 which have longitudinal parallel axes are mounted on each corner of the base plate 21. As shown in FIGS. 5a, b, c, and d, a contact disk 63 is rotatably mounted at the underside of a turn table 38 by a central pivot pin 39 which also passes through the plate 21 and a ball bearing or roller bearing disposed along the periphery of the turntable. The disk 63 is substantially circular. A gear 42 mounted on the turntable 38 and projecting through a slot 38' therein meshes with a circular row of holes on the contact disk 63. Two lugs 55 and 56 radially project from the turntable in opposite directions and carry axial pins 8, 9 having enlarged heads on their free ends. The head of each pin slides on the inclined surface of a slotted cam 45, 46 mounted on the base plate 21 to move the turn table 38 up and down when it pivots on the pin 39. When the turntable 38 is rotated clockwise from the position shown in FIG. 5d, the head of each pin ascends the inclined surface of the associated cam. When it comes to the end part of the cam surface which is not inclined relative to the base plate surface, the turn table 38 is in contact with the lower face of the base plate. Four axial supporting pins 47, 48, 49 and 50 are circumferentially spaced about the pivot pin 39 on the turn table 38. When the turn table is in its lowest position, the pins 47–50 contact the lower face of the base plate. Four openings 51, 52, 53 and 54 are provided in the base plate to receive the pins as the turn table ascends. When the turn table is rotated clockwise from the position shown in FIG. 5d, the top of each supporting pin first slides along the lower face of the base plate to reach the associated opening, and then passes upward through the opening.

A shaft 92 which carries the wheels 34 and 35 is provided with sprocket wheels 41. The splined shaft 57 which is coupled with the transmission 28 is also connected to a gear box 58. Sprocket wheels 65 on an output shaft of the gear box 58 and the sprocket wheels 41 are connected by a chain, whereby the wheels 34, 35 may be rotated.

The wheels 36 and 37 are mounted on a common shaft 93 and are idlers. The gear 42 is rotated by another output shaft 59' of the gear box 58 through a universal joint 59, a splined shaft 61 and a universal joint 60, and the contact disk 63 is rotated thereby. The wheels 34–37 and the contact disk 63 rotate simultaneously, but they are not simultaneously in contact with the ground. The gear box 58 is positioned on the upper face of the base plate and an opening 78 is provided in the base plate 21 for the shaft 61.

Figures 5D, 5E:
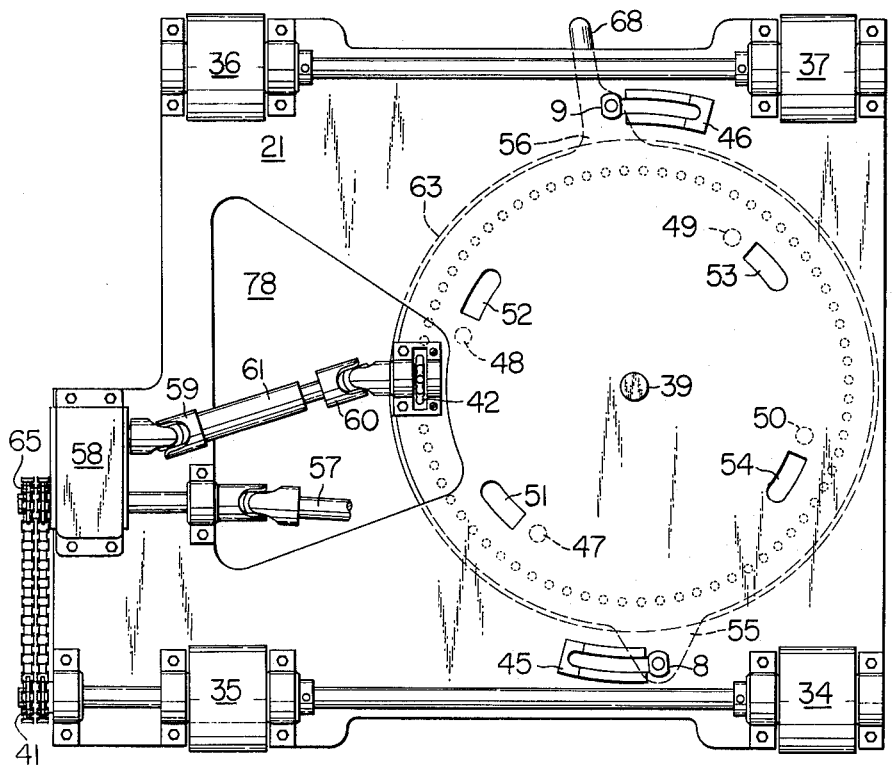
FIG. 5d is a top plan view of the device illustrated in FIG. 5c.
FIGS. 5e shows a detail of the device illustrated in FIG. 5a, FIG. 5b, FIG. 5c and FIG. 5d.
Figure 6A:
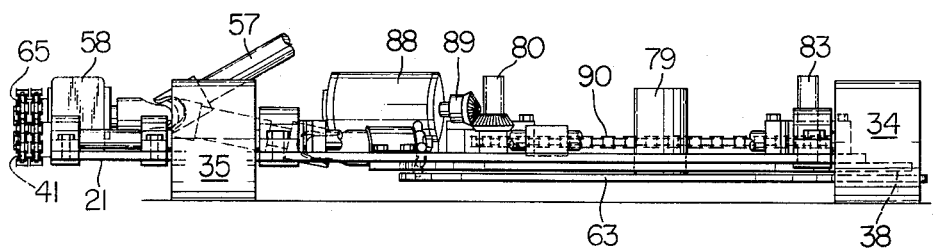
Figure 6B:
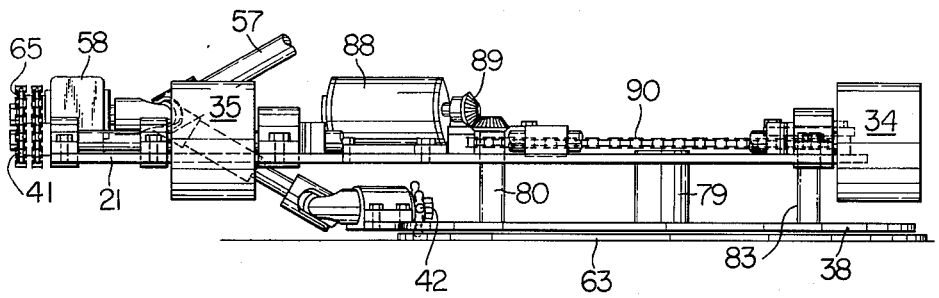
FIG. 6b shows the device illustrated in FIG. 6a in a view corresponding to FIG. 5c.
Figure 6C:
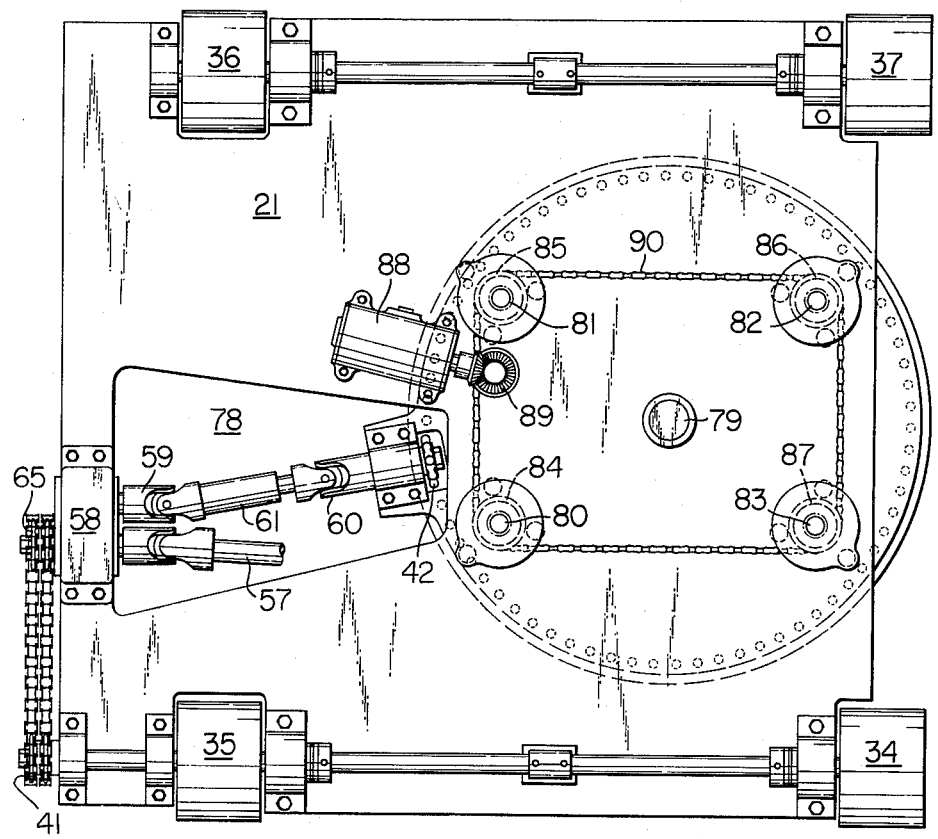
FIG. 6c is a top plan view of the device illustrated in FIG. 6a and FIG. 6b.

The turn table 38 is moved up and down relative to the base plate 21 by an arm 68 integral with the lug 56, and a hydraulic actuator 69 illustrated in FIG. 5e is provided under the floor of the automobile for operating the arm 68. The actuator 69 is controlled in a conventional manner (not shown) from the driver's seat. An alternative device for moving the turn table 38 up and down is shown in FIGS. 6a, b and c. A stub shaft 79 is fixedly fastened to the center of the turn table 38, and is slidably secured to the base plate 21. Four threaded columns 80, 81, 82 and 83 are fixed at equal intervals from the center on the upper face of the turn table 38. They engage respective internally threaded sprocket wheels 84, 85, 86 and 87 connected by a chain 90. Another sprocket wheel, not itself visible in the drawing, meshes with the chain 90 and transmits the driving force of a motor 88 from bevel gears 89 to the sprocket wheels 84, 85, 86 and 87.

Figure 7A:
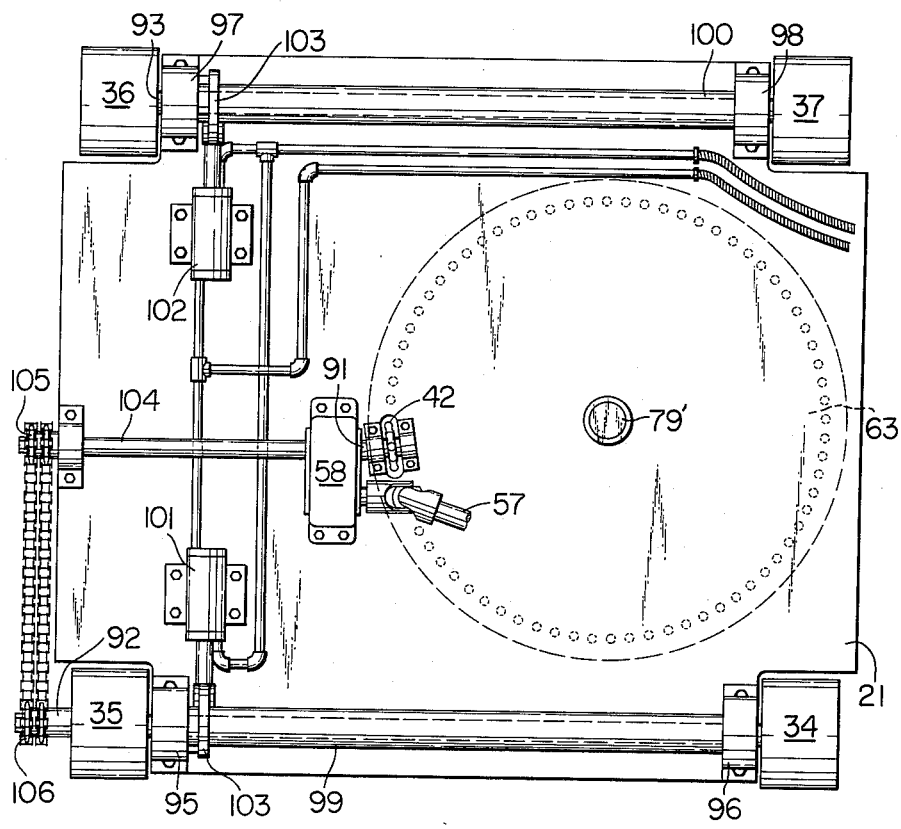
FIG. 7a is a top plan view of yet another embodiment of this invention in a view corresponding to FIG. 5b.
Figure 7B:
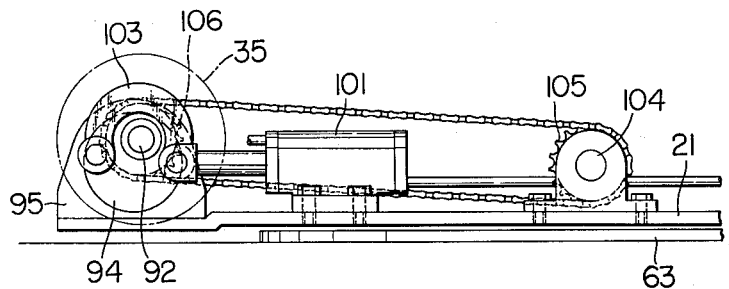
Figure 7C:
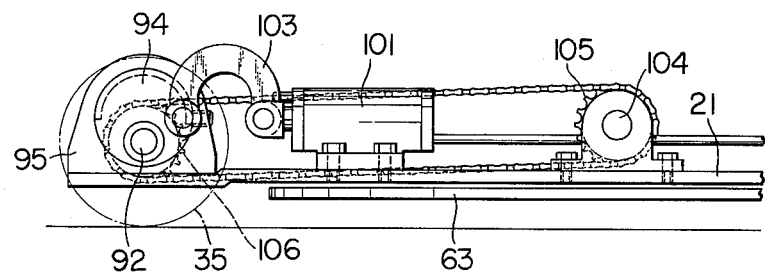
FIG. 7c shows the device illustrated in FIG. 7b in a different position.

Yet another device for moving the wheels 34 to 37 up and down on the base plate 21 is illustrated in FIGS. 7a, b and c. The contact disk 63 is pivotally mounted on the base plate in fixed axial relationship by a shaft 79' and a non-illustrated roller or ball bearing, and is provided with a row of holes which mesh with a gear 42. The gear 42 and the gear box 58 are connected by a shaft 91. The wheels 34–37 are mounted on shafts 92 and 93 which pass through pipes 99, 100 supported at their ends by bearings 95, 96, 97 and 98. Hydraulic jacks 11 and 102 mounted on the base plate 21 are operated in a non-illustrated manner from the driver's seat. As shown with respect to the bearing 95 and the hydraulic jack 101 in FIGS. 7b and c, each bearing rotatably encloses a cylindrical plug 94. The shaft 92 is eccentrically journaled in the cylindrical plug. The piston rod of the hydraulic jack 101 is hingedly connected to the plug 94 by a U-shaped connecting rod 103 which rotates the plug 94 when the jack 101 operates. The cylindrical plugs 94 in the bearing 95 and the bearings 96 are fixedly connected by the pipe 99. A mechanism of the same type is also provided in the bearings 97 and 98.

The wheels 34, 35 are driven through sprocket wheels 105 fixed on a shaft 104 which extends rearwardly from the gear box 58, sprocket wheels 106 on the shaft 92, and a chain mounted therebetween. The hydraulic mechanism is operated by a non-illustrated master-cylinder actuated by a pedal or a hand lever at the driver's seat.

Figure 1:
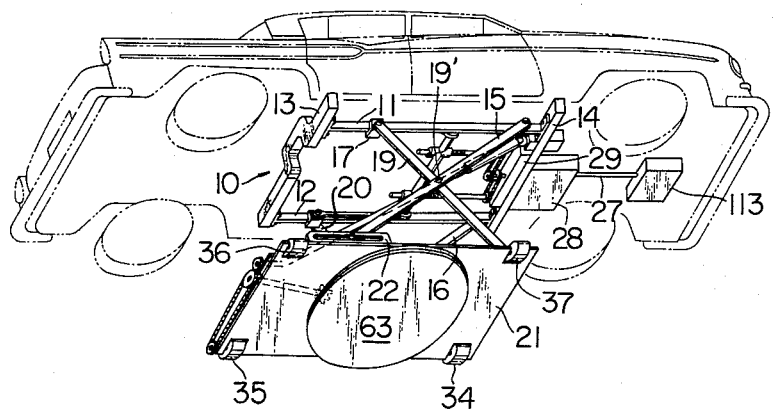
Figure 2:
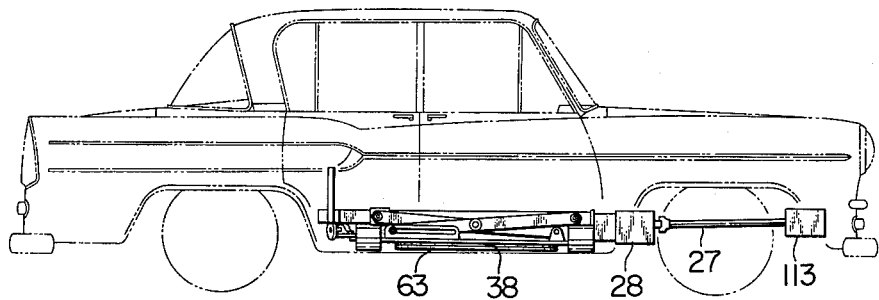
FIG. 2 is a side-elevational view of the apparatus according to FIG. 1 in the operative conditions, the automobile being shown in broken lines.

The several illustrated embodiments of the invention are provided with a band brake 107 which engages the splined shaft 57 and controls the driving force for the mechanism for lateral movement and the turning mechanism. The band brake 107 is connected to the brake of the automobile by a partly illustrated linkage 107' and is operated by stepping on the brake pedal at the driver's seat. A pin 108 extends along the threaded rod 31 through holes in the transverse member 26, in the bearing assembly 29 and in the frame 10, and is linked to a shaft 109 which projects from a side surface of the transmission 28. At the rear end of the pin 108, there is provided an abutment 111 for engagement with the rear face of the member 26 just before the base plate 21 contacts the frame 10. Another abutment 112 is engaged by the member 26 just before the base plate 21 and the frame 10 are farthest removed from each other. Longitudinal movement of the pin 108 by engagement with the member 26 releases a clutch (not illustrated) in the transmission 28 by means of the shaft 109 at the completion of the up and down movements of the base plate 21. As will be described later, the clutch is engaged by a lever 114 operated from the driver's seat. As shown in FIG. 1, the front part of the automobile carries speed reduction gearing in a box 113 which also encloses controls for the apparatus of the invention, and is connected to the transmission 28 by the shaft 27 and to the non-illustrated engine of the car.

*Operation*

The transmission lever of the automobile is first set in neutral. In the first-described embodiment, the mechanism for actuating the lever 68 of the turn table 38 is operated by a pedal, whereby the turn table 38 may be raised and lowered. In the second embodiment, the operator uses a switch for actuating the forward and reverse movement of the motor 88 for the same purpose. In the third embodiment, a master cylinder is operated by a pedal provided at the driver's seat. The crank shaft of the engine and the gearing in the box 113 are connected to the devices of the invention by first shifting an operating lever 114 (FIG. 3) on the transmission 28 to a position in which the output shaft 73 rotates clockwise, and then engaging the clutch in the box 28 by a lever 115, whereby the torque of the engine is transmitted to the shaft 73 to move the member 26 forward and to lift the automobile. When the automobile has been lifted, the pin 108, shaft 109, abutments 111 and 112 operate to move the lever 115 to a neutral position. The clutch is released. The lever 114 may also be shifted to positions in which the shaft 57 is rotated clockwise or counter-clockwise as needed for turning or laterally moving the automobile. The speed of these operations is controlled by the speed of the engine and they are stopped by stepping on the brake pedal of the automobile which is connected with the brake system of the turning and lateral moving mechanisms.

It should be understood, of course, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What is claimed is:
1. An apparatus for moving a vehicle comprising, in combination:
   (a) frame means adapted to be fastened to the underside of said vehicle;
   (b) a base plate;
   (c) lifting means interposed between said frame means and said base plate for moving said base plate relative to said frame means toward and away from a fastened vehicle;
   (d) wheels mounted on said base plate for rotation about normally horizontal axes;
   (e) a contact disk mounted on said base plate for rotation about a normally vertical axis;
   (f) positioning means for moving said wheels and said contact disk relative to each other between a first position in which said wheels extend from said base plate in a direction away from said frame means beyond said disk, and a second position in which said disk extends from said base plate in said direction beyond said wheels; and
   (g) drive means for actuating said lifting means, and for rotating said wheels and said disk.

2. An apparatus as set forth in claim 1, wherein said positioning means include means for moving said wheels relative to said base plate toward and away from said frame means, said disk being secured on said base plate against axial movement.

3. An apparatus as set forth in claim 1, wherein said positioning means include plug means rotatable about a normally horizontal axis on said base plate, said wheels being eccentrically journaled in said plug means, and means for turning said plug means about the axis thereof.

4. An apparatus as set forth in claim 1, wherein said positioning means include moving means for moving said disk relative to said base plate toward and away from said frame means, said wheel means being secured on said base plate against movement in the direction of said normally vertical axis.

5. An apparatus as set forth in claim 4, wherein said moving means include a turn table rotatably mounted on said base plate, rotating means for rotating said turn table on said base plate, and cam means interposed between said turn table and said base plate for moving said turn table in the direction of said normally vertical axis when the same is rotated by said rotating means, said contact disk being mounted on said turn table for rotation about said normally vertical axis.

6. An apparatus as set forth in claim 4, wherein said moving means include a turn table, said turn table and said base constituting a pair of members movable relative to each other in the direction of said normally vertical axis, a threaded element fixedly fastened on one of said members, another threaded element threadedly movable on said fixed threaded element and abuttingly engaging the other member of said pair, and actuating means for actuating threaded movement of said elements relative to each other, said contact disk being rotatably mounted on said turn table 7. An apparatus as set forth in claim 4, wherein said moving means include a turn table, a plurality of threaded elements fixedly fastened on said turn table, a plurality of other threaded elements respectively threadedly engaging said fixedly fastened elements and abuttingly engaging said base plate, and actuating means for actuated simultaneous threaded movement of said other elements relative to the corresponding fixedly fastened threaded elements.

References Cited by the Examiner
UNITED STATES PATENTS

| | | | |
|---|---|---|---|
| 1,827,853 | 10/1931 | Nenna | 180—1 |
| 2,034,965 | 3/1936 | Truitt | 180—1 |
| 2,235,595 | 3/1941 | Stein | 180—1 |

A. HARRY LEVY, *Primary Examiner.*